United States Patent [19]

Shragal

[11] 3,811,047

[45] May 14, 1974

[54] BALANCE CONTROL

[75] Inventor: Robert Shragal, Bellwood, Ill.

[73] Assignee: Wells-Gardner Electronics Corporation, Chicago, Ill.

[22] Filed: Oct. 18, 1972

[21] Appl. No.: 298,575

[52] U.S. Cl. .............. 250/208, 250/210, 250/211 K, 250/221, 250/222 R, 250/237 R

[51] Int. Cl. .............. H01j 39/12

[58] Field of Search .......... 250/231 R, 231 SE, 237, 250/220, 221, 222, 211 K, 210, 215, 216, 202, 203, 208, 209, 227

[56] References Cited

UNITED STATES PATENTS

| | | | |
|---|---|---|---|
| 3,190,131 | 6/1965 | Daubert | 250/231 R |
| 3,480,788 | 11/1969 | Barbieri | 250/231 R |
| 3,521,072 | 7/1970 | Wipson | 250/231 R |
| 3,432,671 | 3/1969 | Edmonds | 250/216 |
| 3,478,220 | 11/1969 | Milroy | 250/221 |
| 3,465,099 | 9/1969 | Harris | 250/237 |

*Primary Examiner*—Archie R. Borchelt

*Assistant Examiner*—D. C. Nelms

*Attorney, Agent, or Firm*—Mason, Kolehmainen, Rathburn & Wyss

[57] ABSTRACT

A balance control comprising an elongated control stick adapted to be angularly manipulated relative to a longitudinal neutral axis about a pivot point thereon, a plurality of light sensitive, electronic control devices spaced equidistant from said point in opposite directions from said axis, and means forming a light pattern having areas of different intensity and position controlled by manipulation of said stick to simultaneously change the light intensity of said light pattern on said respective electronic control devices.

30 Claims, 18 Drawing Figures

FIG. 5
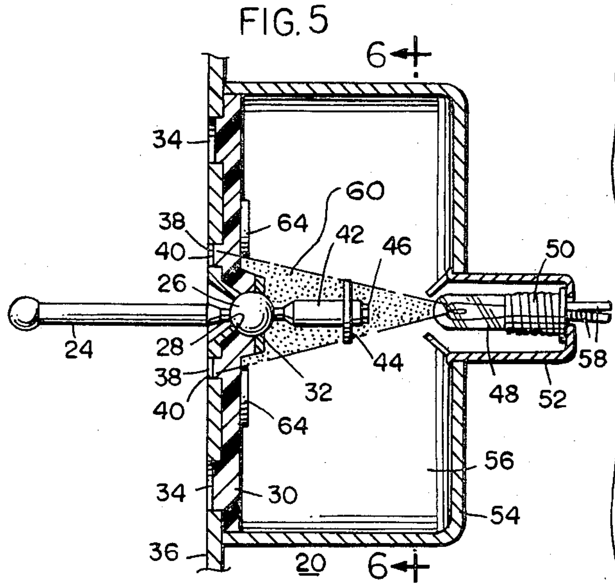
FIG. 6
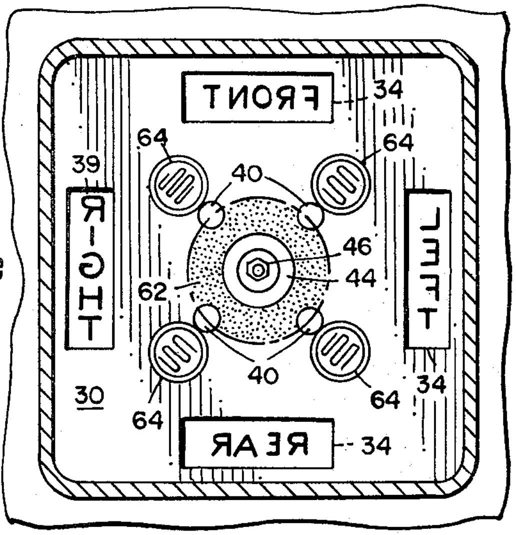
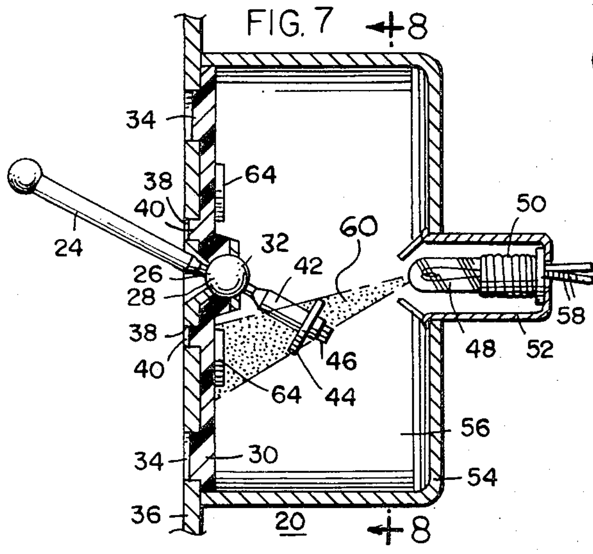
FIG. 7, FIG. 8
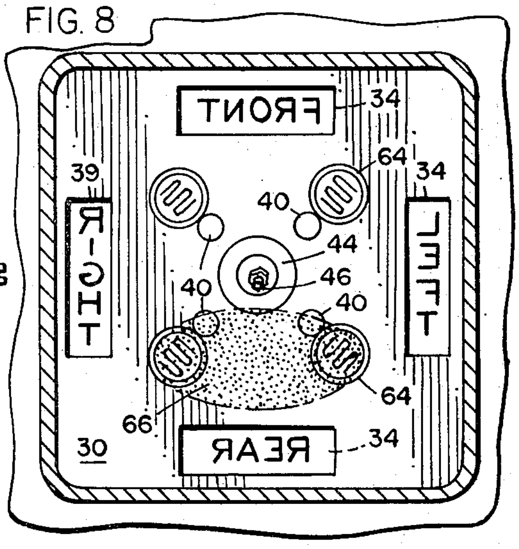
FIG. 9
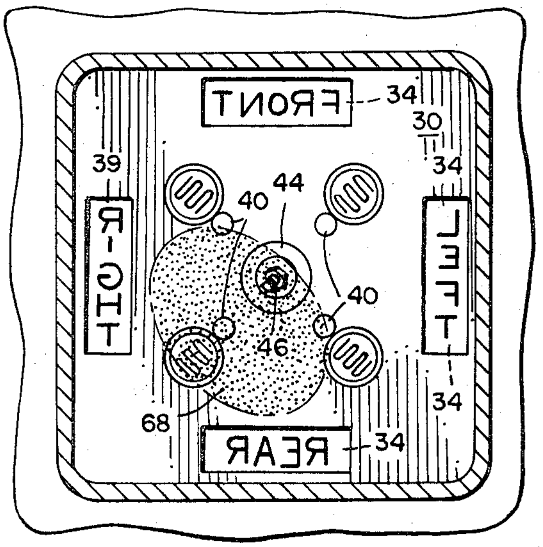

BALANCE CONTROL

The present invention relates to a balance control and more particularly relates to a manually operated balance control for controlling a quadrasonic sound system or the like.

In modern, high fidelity sound reproducing systems there may be provided as high as four different loud speakers arranged on the circumference of a circle around the central position of a listener. In this type of system employing two channels, one of the speakers may be responsive to a signal from one channel and an oppositely positioned speaker may be responsive to a signal from the second channel, while the other two speakers may be responsive to signals derived from the sum and difference of the two channels. The balance control of the present invention is adapted to positively select and blend such signals so that the sound developed at the speakers is pleasing and balanced to the ear of a listener. In this regard, it may be desirable to selectively increase or decrease the signal outpout to one or more of the several speakers in relation to the others and the balance control of the present invention provides a means for simultaneously controlling electronic signals for any two or more speakers, amplifiers, etc. as selected and adjusted by the listener.

In U.S. Pat. No. 3,521,072 to J. W. Wipson et al, issued July 21, 1970, there is disclosed a system for the variable masking of radiation sensitive areas along perpendicular X and Y axes by movement of a control shaft. The balance control of the present invention, however, provides a means for balancing and controlling the electric current flow through opposite ones of any number of pairs of light sensitive, electronic control devices and permits unique combinations of signal intensities. For example, in a four channel system, one combination may permit a maximum output from two channels and a minimum output from opposite channels. Another control combination provides a maximum output from a single channel, an intermediate output from a pair of channels, and a minimum output from the remaining channel.

It is an object of the present invention to provide a new and improved balance control for selectively controlling a plurality of electronic control devices.

Another object of the present invention is to provide a new and improved balance control of an extremely universal nature whereby a maximum number of possible control combinations are available for a given number of electronic control devices in a system.

Another object of the present invention is to provide a new and improved manually operated balance control of the character described which is low in cost, easy to use, neat in appearance and compact in size.

Another object of the present invention is to provide a new and improved balance control employing a manually actuated control stick for providing an operator with a sense of feel toward the control being effected thereby.

Another object of the present invention is to provide a new and improved balance control having visual means for communicating to an operator the control combination effected by the movements of a control stick or shaft.

Another object of the present invention is to provide a new and improved balance control of the character described including novel means forming a light pattern with areas thereof having different intensities and a novel system for movement and manipulation of the light pattern to effect control of a plurality of electronic control devices.

Another object of the present invention is to provide a new and improved balance control of the character described wherein changes in angular relation between a light source and a plurality of light sensitive, electronic control devices are provided to effect control.

Another object of the present invention is to provide a new and improved balance control of the character described wherein a light source is fixedly mounted with respect to a plurality of light sensitive electronic control devices and a light pattern from the source is manipulated to effect control.

Another object of the invention is to provide a new and improved balance control of the character described which can utilize light sensitive diodes, photo cells, photo sensitive field effect transistors, or light dependent resistors.

Another object of the present invention is to provide a new and improved balance control for a plurality of light sensitive control devices which is fail safe in that a failure of the light source therein because of a burned out bulb or other reason, does not render the devices inoperative.

Another object of the invention is to provide a new and improved balance control of the character described employing a movable light pattern for controlling a plurality of electronic control devices wherein failure of said light pattern does not render said control devices inoperative.

Yet another object of the invention is to provide a balance control of the character described including novel means for visual indication of the position of the controlling light pattern.

Still another object of the invention is to provide a novel visual indicator for a balance control which is normally fully illuminated in a neutral position, partially illuminated when out of a neutral position, and not illuminated when a control failure has occurred.

The foregoing and other objects and advantages of the present invention are accomplished in an illustrated embodiment described herein comprising a new and improved balance control having an elongated control shaft adapted to be angularly manipulated relative to a longitudinal, neutral axis about a pivot point thereon. A plurality of light sensitive electronic control devices, such as light dependent resistors, are spaced equidistant from said point and in opposite directions from said neutral axis. Means is provided for forming a light pattern having areas of different intensity therein and position controlled by manipulation of said control shaft to simultaneously change the light intensity of the light pattern on opposite ones of said control devices.

For a better understanding of the present invention reference should be had to the following detailed description when taken in conjunction with the drawings in which:

FIG. 5 is a sectional view taken substantially along lines 5—5 of FIG. 1;

FIG. 6 is a sectional view taken substantially along lines 6—6 of FIG. 5;

FIG. 7 is a sectional view similar to FIG. 5 but illustrating the control stick of the balance control in a different operating position;

FIG. 8 is a cross sectional view taken substantially along lines 8—8 of FIG. 7;

FIG. 9 is a sectional view similar to FIG. 8 but illustrating the effect of movement of the control stick of the balance control to yet another different operating position;

Figures 1, 2, 3, 4:
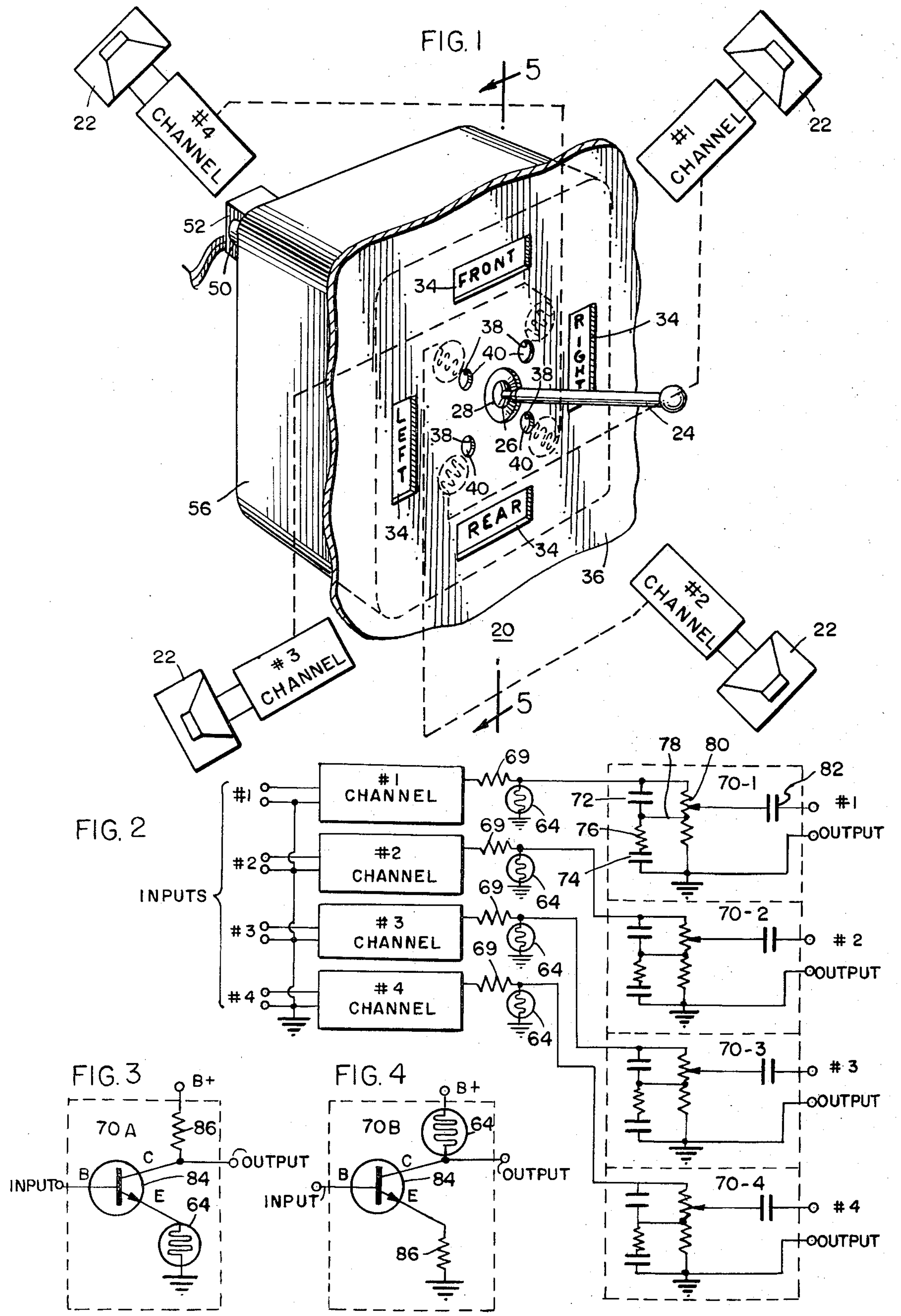
FIG. 1 is a front, perspective view of a control panel and shaft of a balance control constructed in accordance with the features of the present invention and a four-channel, sound system is indicated schematically.
FIG. 2 is a schematic, wiring diagram incorporating a balance control in accordance with the present invention for controlling a four channel system.
FIG. 3 is a schematic wiring diagram illustrating a slightly different type of gain control circuit for use with a balance control of the invention.
FIG. 4 is a block diagram illustrating yet another type of gain control circuit for use with a balance control of the invention.

Referring now more particularly to the drawings therein is illustrated a new and improved balance control constructed in accordance with the features of the present invention and referred to generally by the reference numeral 20. The balance control 20 is especially adapted for use in balancing and controlling the sound intensity developed by the several speakers of a quadraphonic sound system indicated schematically in FIG. 1. The sound system includes four separate channels labeled No. 1, No. 2, No. 3 and No. 4 and each channel is provided with a separate speaker or sound output device 22 which may be positioned equilaterally on the circumference of a circle surrounding a listener. The balance control 20 is utilized for controlling the electrical signals sent to the respective speakers 22 as indicated in the schematic diagram of FIG. 2; however the control may also be used to control and blend input signals to the respective individual channels 1, 2, 3 and 4, or may also be used for other applications such as in an illumination control system employing a number of spot lights positioned at spaced apart locations.

The balance control 20 includes an elongated shaft or control stick 24 having a spherically shaped ball portion 26 intermediate its ends seated in a socket 28 formed adjacent the center of a front wall 30 preferably formed of transparent or translucent resinous plastic material such as acrylic resin. The socket 28 has wall surfaces conforming to segments of a sphere of substantially the same diameter as the ball 26 on the control stick and the ball is held in place by means of an annular washer-like member 32 having an inner surface portion similarly shaped to conform to portions of a spherical surface.

The plastic front wall 30 of the balance control is provided with identifying sections 34 which bear the indicia of "Front", "Rear", "Left" and "Right" respectively as shown and these generally rectangular sections preferably are integrally formed wiith embossed lettering thereon and adapted to extend into and key with appropriately positioned rectangular slots defined in a front plate or escutcheon plate 36. As best indicated in FIG. 1, the escutcheon plate 36 is also provided with a plurality of equilaterally and diagonally spaced apart light indicator openings 38 on opposite sides of the ball socket 28. The transparent or translucent plastic front wall 30 is provided with small cylindrical dot-like projections 40 of the desired color which are illuminated selectively for indicating visually the control position of the control stick 24 and thus give the operator a better feel when using the balance control.

The control stick 24 includes a rearwardly extending portion 42 which carries a circular shadow disk 44 held in place by suitable means such as a nut 46 threaded onto a rearward threaded end portion of the control stick. In accordance with the present invention, the shadow disk 44 is adapted to functionally cooperate with a fixedly positioned light source comprising an electric bulb 48 mounted in a socket 50 which is carried in a U-shaped bracket 52. The bracket 52 is removably attached to the rear wall 54 of a control enclosure or housing 56 having a peripheral sidewall 55 which cooperates with the forward wall 30 to provide a complete, light-tight enclosure for the balance control. The light bulb is illuminated by electric current supplied from an external source via leads 58 and when the light is turned on functional cooperation with the circular shadow disk 44 is provided to produce a conically shaped pattern or shadow area 60 which forms dark and light areas on the plastic front wall 30. When the control stick 24 is centered in the neutral position as shown in FIGS. 5 and 6, the shadow produced provides a circular dark area 62 on the rear face of the plastic front wall 30 and the circular area is of a diameter such that the light dots 40 are illuminated in appearance from the front of the escutcheon plate 36.

In accordance with the present invention the balance control 20 includes one or more pairs of light sensitive, electronic control devices such as photo cells, photo sensitive field effect transistors, light sensitive diodes or light dependent resistors 64 spaced equidistant from the pivot center of the ball portion 26 on the control stick and on opposite sides of a neutral axis perpendicular to the front wall 30 and centered on the socket 28 as best shown in FIG. 6. The light dots 40 are positioned outward of the socket on diametrical lines perpendicular to the neutral axis and a dot is provided for each light dependent resistor 64 (hereinafter referred to as LDR) to indicate visually to the control operator how much light the LDR is receiving from the light bulb 48. As illustrated in FIG. 6, when the rearwardly facing surface of an LDR 64 is brightly illuminated by light from the bulb 48 the resistance thereof takes on a particular value and when portions or all of the light sensitive areas on the LDRs are dimly illuminated or masked off in the shadow pattern created by the disk 44, the resistance of the LDR takes on a different resistive value. The spacing distance between the diametrically opposed LDRs 64 on opposite sides of the neutral axis, the size of the shadow disk 44 and the spacing between the forward wall 30 of the housing and the light source 48 is selected so that movement of the control stick 24 about the pivot point at the center of the ball portion 26 into a particular angular alignment with respect to the neutral axis produces differential lighting effects with respect to the LDRs. The light pattern or light intensity level reaching the particular LDRs is thus controlled by the direction and amount of angular movement of the control stick from the neutral axis position. As shown in FIG. 7, the outer end of the control stick 24 may be moved vertically upward and the centered circular pattern 62 of FIG. 6 is changed to an elliptical shadow pattern 66 as in FIG. 8 which covers the lower pair of LDRs 64 and their respective light dots 40 but leaves uncovered the upper pair of LDRs and their associated light dots. As illustrated in FIG. 9 the control stick 24 may also be manipulated laterally to produce a laterally off-center elliptical pattern 68 as illustrated in which the lower left hand LDR (as viewed in FIG. 9) is covered by the shadow pattern while the upper left hand and lower right hand LDRs are only partially covered as are their respective light dots 40. In this position the upper right hand LDR 64 and its associated light dot 40 is completely uncovered and is exposed to maximum illumination.

From the foregoing it will be seen that the control stick 24 can be angularly manipulated out of the neutral position wherein none of the spaced apart LDRs 64 are within the circular shadow pattern 62 into an almost infinite variety of different control positions providing differential exposure or light intensity on the diametrically opposed pairs of LDRs 64. It should be understood of course that while light dependent resistors 64 have been used effectively as control devices, other light sensitive electronic control devices as heretofore mentioned are also well adapted for use in the present invention.

Referring now specifically to FIGS. 2, 3, 4 in FIG. 2 is illustrated a four channel sound reproduction system wherein four different input signals are fed into the respective channel amplifiers labeled No. 1, No. 2, No. 3, and No. 4. Output signals from the respective channel amplifiers are directed into four separate gain control circuits labeled 70–1, 2, 3, 4 respectively. Each channel includes a series resistor 69 and the light dependent resistor 64, which is mounted in the housing 56 of the balance control 20, is connected in shunt so that it forms a voltage divider with the resistor 69. The resistors 69 may be of a relatively large value relative to the minimum resistance of the light dependent resistors 64 so that a wide range of control which is independent of the main gain control of the channel. For example, the resistance of the light dependent resistor 64 may vary from 1,000 ohms at full illumination to 50,000 ohms at minimum light levels. Each gain control circuit 70 also includes a pair of condensers 72 and 74 in series with and opposite sides of a resistor 76. The capacitor 72 and resistor 76 function to provide tone compensation in conjunction with the main gain control potentiometer 80. One end of this series string is connected to ground while the opposite end is adapted to receive the signal across the light dependent resistor 64. This series circuit is shunted by the tapped potentiometer 80 and a lead 78 is provided from the junction between condenser 72 and the resistor 76 and the tapped terminal connection of the potentiometer 80. As the amount of light intensity striking the LDR 64 in each gain control circuit is varied by manipulation of the control stick 24 the effective resistance value of the LDR is changed and accordingly the voltage signal across the terminals thereof is then varied. This change in gain is reflected at the output of the gain control circuit which is coupled to an appropriate load via an output capacitor 82. In addition the potentiometer 80 may be independently adjusted to change the overall level in a particular sound channel.

In FIG. 3 there is illustrated an alternate gain control circuit 70A utilizing a transistor and this type of circuit can be substituted for the gain control circuits of FIG. 2. In the transistorized gain control circuit of FIG. 3, a transistor 84 is connected in series with the LDR 64 between the emittor of the transistor and ground. An input signal is supplied to the base of the transistor and "B" plus voltage is supplied through a resistor 86 to the collector terminal of the transistor which services as an output terminal for the circuit. As the value of the resistance of the LDR 64 is changed by varying the light intensity thereon, the gain of the circuit 70A is changed and reflected at the output terminal on the collector of the transistor.

In FIG. 4 a gain circuit 70B is illustrated which is generally similar to the circuit 70A, however, the resistor 86 is connected in the emmitor to ground circuit and the LDR 64 is connected between the "B" plus source and collector terminal. Either of the gain control circuits 70A or 70B may be substituted for the respective circuits 70–1, 2, 3 and 4 of the sound system circuit of FIG. 2.

Figures 10, 11:
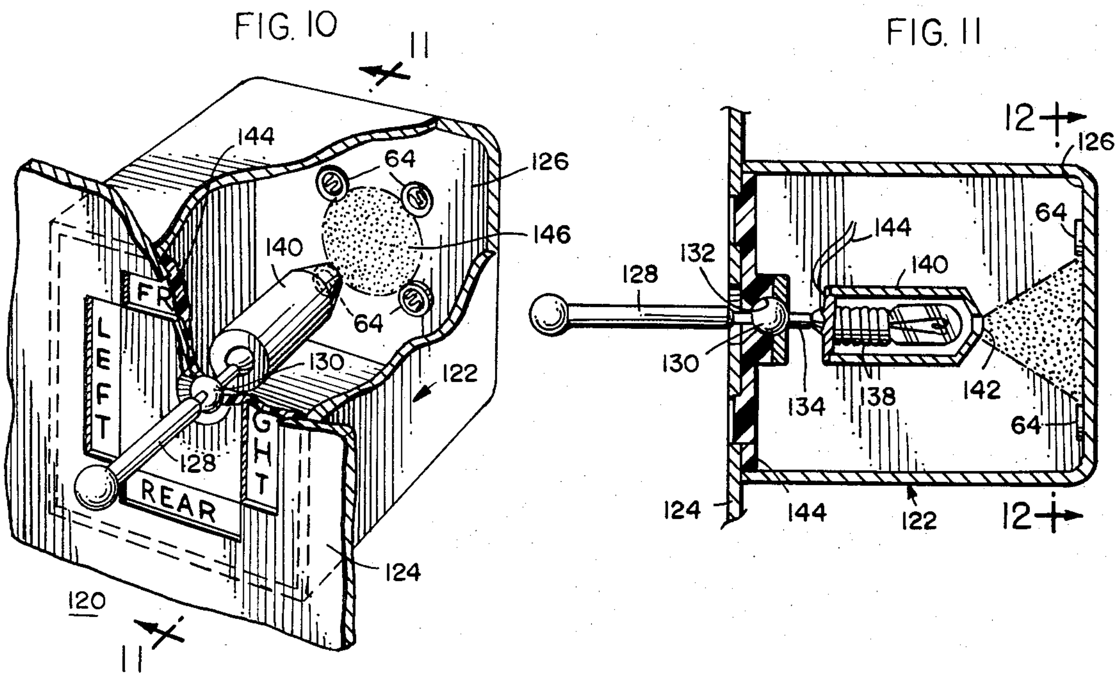
FIG. 10 is a front perspective view, with portions broken away to better show the internal components of another embodiment of a balance control constructed in accordance with the features of the present invention.
FIG. 11 is a cross sectional view taken substantially along line 11—11 of FIG. 10.

Referring now to FIGS. 10 through 15, therein is illustrated another embodiment of a new and improved balance control constructed in accordance with the features of the present invention and referred to generally by the reference numeral 120. The balance control 120 includes a rectangular housing or enclosure 122 having a front wall 124 and a rear wall 126. As illustrated in FIG. 10 the front wall 124 includes indicia formed thereon indicating "Front", "Rear", "Left" and "Right" for directional control of an elongated control shaft or stick 128 having a spherical ball portion 130 intermediate its ends seated in a socket enclosure 132 provided at the center of the housing front wall 124.

Figure 12:
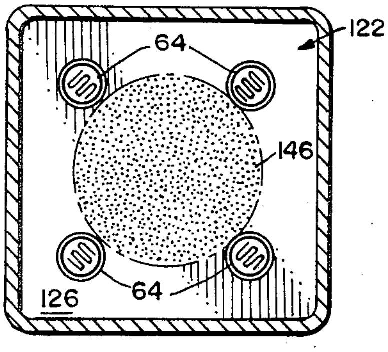
FIG. 12 is a cross sectional view taken substantially along line 12—12 of FIG. 11.
Figure 13:
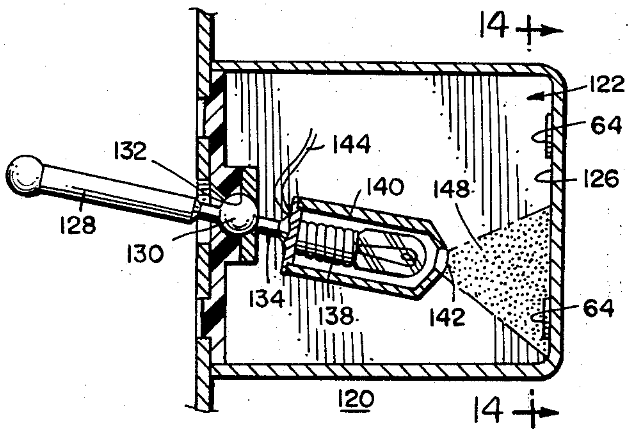
FIG. 13 is a cross sectional view, similar to FIG. 11 but illustrating the control stick of the balance control in a different operative position.
Figure 14:
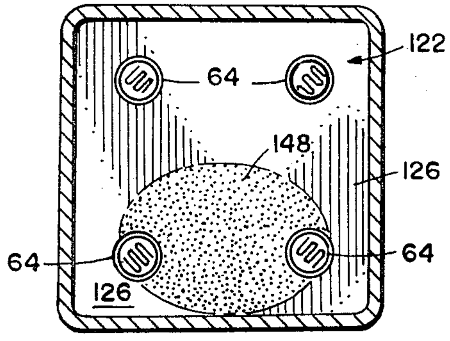
FIG. 14 is a cross sectional view taken substantially along lines 14—14 of FIG. 13.
Figure 15:
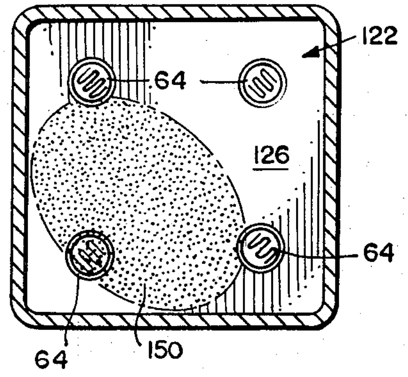
FIG. 15 is a cross sectional view similar to FIG. 14 but illustrating the balance control with its control stick in yet another operative position.

The control stick 128 is pivotally movable out of neutral position aligned perpendicular to the front wall (FIGS. 11 and 12) by manual manipulations of the outer end. The control stick includes an inner end portion 134 extending into the housing and providing support for a movable light source comprising an electric light bulb 136 which is mounted in a socket 138 carried in a light enclosure 140 having a rearwardly facing lens structure 142. Electric current for illuminating the light bulb is supplied through flexible wires 144 in order to permit angular adjustment of the longitudinal axis of the light enclosure 140 as the control stick 128 is manipulated angularly with respect to the neutral position about a pivot point at the center of the spherical ball portion 130. The lens 142 is adapted to cast a conical light pattern 125 extending rearwardly of the light bulb 136 and coaxially aligned therewith. The conical light pattern forms an illuminated circular area 146 on the rear wall 126 of the housing when the control stick 128 is centered in the neutral position as shown in FIGS. 11 and 12. In accordance with the present invention, pairs of light sensitive electronic control devices such as light dependent resistors (LDRs) 64 are mounted on the rear wall 126 and are positioned equidistant from the pivot point at the center of the control stick ball 130 on opposite sides of a point "A" of intersection of the neutral axis on the rear housing wall 126. As best indicated in FIG. 12, when the control stick 128 is in a neutral position the longitudinal axis of the conical light pattern is aligned to provide the circular illumination pattern 146 which covers and illuminates all of the LDRs 64 with substantially equal light intensity. By manipulating the control stick 128 as shown in FIG. 13 the circular pattern is changed to an elliptical pattern 148 (FIG. 14) wherein only the lower pair of LDRs 64 are illuminated while the upper pair of LDRs are in a dark or nonilluminated area out of the conical light pattern. In a similar fashion as illustrated in FIG. 15, when the control stick 128 is moved laterally, a different elliptical pattern 150 is formed and this pattern generally illuminates the lower left hand LDR, partially illuminates the upper left hand and lower right hand LDR while leaving the upper right hand LDR in a dark or nonilluminated area. In this manner the balance control stick 128 of the present invention is adjusted by manual movement relative to the neutral axis position about a pivot point at the center of the ball 130.

Figures 16, 17, 18:
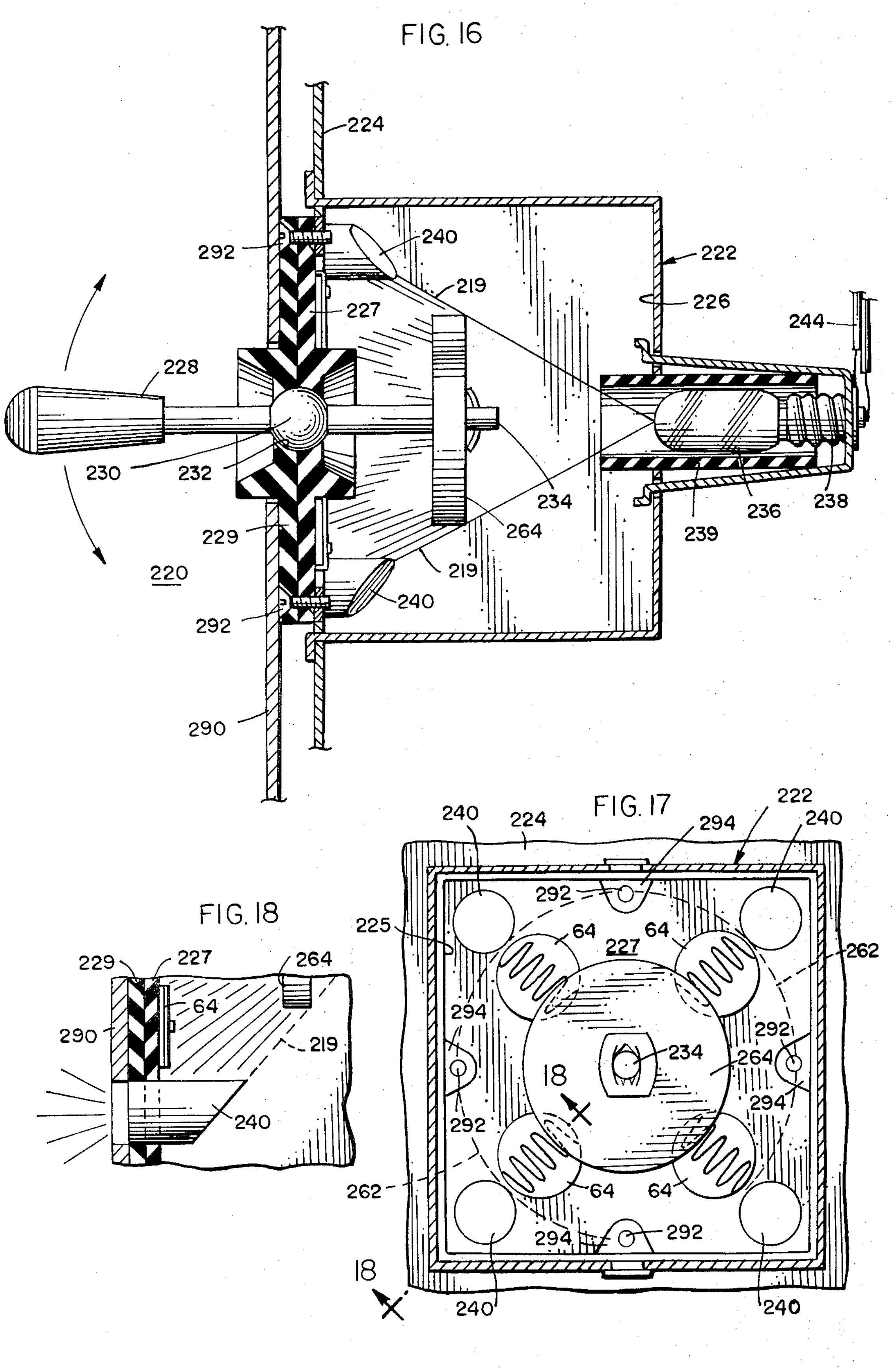
FIG. 16 is a sectional view similar to FIG. 5 of yet another embodiment of a balance control constructed in accordance with the features of the present invention.
FIG. 17 is a sectional view taken substantially along line 17—17 of FIG. 16.
FIG. 18 is a sectional view taken substantially along line 18—18 of FIG. 17.

Referring now to FIGS. 16 through 18, therein is illustrated yet another embodiment of a new and improved balance control constructed in accordance with the features of the present invention and referred to generally by the reference numeral 220. The balance control 220 includes a rectangular housing or enclosure 222 having a front wall 224 and a rear wall 226. As illustrated in FIGS. 16 and 17 the front wall 224 is formed with a square shaped opening 225 and the opening is covered by a socket plate 227 formed of insulating material. The socket plate 227 is sandwiched together with an identical front socket plate 229 to form a spherical socket 232 at the center. An elongated control shaft or stick 228 having a spherical ball portion 230 intermediate its ends seated in the socket enclosure 232 is provided for manipulating the balance control. The control stick is pivotally movable out of a neutral position aligned perpendicular to the front surface of the wall member 224 and includes an inner end portion 234 extending into the housing for supporting a circular shadow disk 264 which forms a darkened or shadow area 262 (FIG. 17) on the rear face of the socket plate 227. An electric light bulb 236 is mounted in a socket 238 carried in a light enclosure 239 centered on the rear wall 226 of the housing in alignment with the socket 232. Electric current for illuminating the light bulb is supplied through flexible wires 244 and as the control stick 228 is manipulated angularly with respect to the neutral position about a pivot point at the center of the spherical ball portion 232, a light pattern or shadow 262 is cast by the conical light pattern 219 extending forwardly of the light bulb and intercepted by the shadow disk 264. The conical light pattern forms a darkened circular pattern 262 centered on the socket wall 227 when the control stick 228 is in the neutral position as shown in FIGS. 16 and 17. In this condition, the area outwardly of the circular pattern is fully illuminated by the light.

In accordance with the present invention, pairs of light sensitive electronic control devices such as light dependent resistors (LDRs) 64 are mounted on the rear face of the wall 227 and are positioned equidistant from the pivot point at the center of the control stick ball 230 on opposite sides of the neutral axis of the control within the circular shadow area 262. When the control stick 228 is in the neutral position the longitudinal axis of the conical shadow pattern 219 is aligned to shield all of the LDRs 64 from the light source. By manipulating the control stick out of the neutral position the circular shadow pattern is changed to an elliptically shaped pattern resulting in differential illumination between each pair of LDRs on opposite sides of the neutral along a selected axis; the amount of light differentiation being dependent on the amount and direction of angular deflection away from neutral with respect to the LDRs on the particular axis.

In accordance with the invention, because the LDRs 64 are not illuminated when the control stick 228 is in neutral and because all of the channels are operative at substantially equal signal intensity in this condition, in the event that the light bulb 236 should burn out or fail to illuminate for any reason the system would continue to operate with equal signal strength on all channels. If light failure occurred when the balance control was out of the neutral position the effect would be the same as if the stick was returned to neutral. This fail safe arrangement is an advantageous feature of the balance control 220.

In order to provide visual means for indicating the position of the balance control 220, a light collecting translucent rod 240 is mounted outwardly of each LDR. The light rods are positioned in the illuminated area outside the neutral circular pattern 262 to receive light while their respective LDRs are within the shadow. As indicated, the rear end surfaces of the light rods 240 are cut on a plane at an acute angle (approximately 45°) relative to the longitudinal axis of the rods so that light received on the rear surface will be collected and directed axially forward because of the index of refraction of the light transmitting material of the rods. The rods or lenses are preferably constructed of clear plastic material such as methyl methacrylate and light falling on the angular rear end surface from the light 236 is directed forwardly in an axial direction. Because of the relative angle between the eliptically shaped end surface of the rods 240 and the light rays from the bulb 236, a larger effective light receiving area is presented and this increases the amount of light available for indication.

The forward end portion of the light rods 240 extend through openings formed in the opaque socket plates 227 and 229 adjacent the four corners thereof and the forward end surfaces of the rods are exposed to the balance control operator to provide a visual indication of the position of balance.

The control may be mounted behind an escutcheon plate 290 having appropriate openings therein for the socket structure and light rods 240 and having indicia thereon indicating "LEFT, RIGHT, FRONT, REAR" as in the previous embodiments. The socket plates 227 and 229 are held together with short screws 292 which project into threaded openings in lugs 294 (FIG. 17) provided around the edge of the square shaped opening in the front wall 224. The screws thus interconnect the socket forming structure and the housing front wall 224.

In both of the balance controls 20 and 120, a light pattern having portions of different light intensity is generated and the pattern is manipulated by angular movement of the control stick. In one case the light source is fixed and a shadow disk is moved to change the position and shape of the light pattern with respect to spaced pairs of light sensitive electronic control devices. In the second embodiment the light source itself is moved to provide movement of the light pattern with respect to the fixed light sensitive control devices.

The balance control 220 provides a fail safe feature wherein failure of the light source does not render the system inoperative but merely returns the system to a neutral or balanced condition. The lights 240 indicate not only the balance position of the control but also indicate when light failure has occurred.

It will be understood that with the various embodiments disclosed the volume in the four channels is preferably made equal when the control stick is in its neutral position by adjustment of the main gain controls, such as the potentiometer 80 in FIG. 2, in each channel. Also, the control circuit for the LDR is usually chosen so that as the control stick is moved toward a particular speaker the signal increases in that speaker and decreases in the other channels. Thus, in the embodiment of FIGS. 1 and 5 to 9, inclusive, where the LDR's are illuminated when the control stick is in its neutral position, the control circuit of FIG. 3 may be used or the circuit of FIG. 2 may be used if the positions of the resistor 69 and LDR 64 are reversed. When so reversed, the LDR 64 will be in series with the signal path and since the LDR 64 is illuminated in the neutral position, the relatively low resistance of the LDR 64 will have minimum attenuation of the signal. In the embodiments of FIGS. 10 to 15 and FIGS. 16 to 18, where the LDR's receive little illumination in the neutral position of the control stick, the control circuit of FIG. 2 or FIG. 4 may be employed.

As the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A control device comprising: an elongated control shaft adapted to be angularly manipulated relative to a longitudinal neutral axis about a pivot point thereon; a plurality of light sensitive, electronic control devices spaced equidistant from said point on opposite sides of said axis; means forming a light pattern having areas of different intensity and movably controlled by manipulation of said shaft to simultaneously change the light intensity of said light pattern on said respective control devices, and indicator means including a visual indicator for each control device for providing comparative indication of the light intensity striking each of said control devices.

2. The control device of claim 1 including two pairs of said control devices positioned on a common plane normal to said neutral axis, each of said control devices located outwardly of said axis on said plane on a position line intersecting said axis and normal to the position line of a next adjacent control device.

3. The control device of claim 1 wherein opposite ones in each pair of control devices are spaced equidistant and in opposite directions from said axis on a common line.

4. The control device of claim 1 wherein said visual indicator for each of said control devices is mounted on a position line extending through said respective device and said axis.

5. The control device of claim 2 wherein said light pattern forming means includes a shadow forming disk movable by said control shaft between said common plane and a fixed light source.

6. The control device of claim 2 wherein said light pattern forming means includes a light source mounted on said control shaft and forming a conically shaped volume of illumination coaxial of said shaft directed toward said common plane.

7. The control device of claim 5 wherein said shadow disk is circular and mounted on said control shaft forming a circular shadow area on said plane when said shaft is aligned on said neutral axis.

8. The control device of claim 7 wherein said circular shadow area is dimensioned so that the outer periphery thereof is spaced between said control devices and said axis when said control shaft is on said neutral axis providing illumination of said control devices with equal intensity from said light source.

9. The control device of claim 8 wherein said shadow area is changed from circular to elyptical shape on movement of said control shaft out of alignment with said axis, said shadow disk being dimentioned to selectively shadow one or more of said control devices.

10. The control device of claim 2 including a visual indicator for each of said control devices spaced between said device and said neutral axis.

11. The control device of claim 10 wherein said indicators comprise means for transmitting light supplied thereto from a light source spaced apart therefrom.

12. The control device of claim 10 wherein said light pattern forming means includes a fixed light source and a shadow forming disk carried on said movable control shaft, said light source and disk forming a circular pattern on said plane when said control shaft is in a neutral position aligned with said neutral axis.

13. The control device of claim 12 wherein disk is dimensioned to form said circular pattern of a size whereby at least portions of said visual indicators are illuminated when said control shaft is in said neutral position.

14. A control device comprising: an indicator control panel, an elongated control shaft adapted to be angularly manipulated relative to a longitudinal neutral axis normal to said panel about a pivot point, ball and socket means on said panel supporting said control shaft for angular manipulation with respect to said neutral axis, two pairs of light sensitive, electronic control devices mounted on a plane normal to said neutral axis and spaced equidistant from said pivot point, each pair of control devices are spaced on opposite sides of said axis on a straight line intersecting the same, and means forming a light pattern having areas of different intensity and movably controlled by manipulation of said shaft out of a neutral position aligned with said axis to simultaneously change the light intensity of said light pattern on said respective control devices.

15. The control device of claim 14 including two pairs of visual signal means on said panel, each of said visual signal means positioned on one of said lines adjacent a control device for indicating the intensity of light received by said device.

16. The control device of claim 15 wherein said visual signal means are positioned between their respective control devices and said neutral axis.

17. The control device of claim 14 wherein said common lines intersect at right angles.

18. The control device of claim 15 wherein said visual signal means are positioned to be at least partially illuminated when said light pattern forming means is manipulated with said control shaft aligned on said neutral axis.

19. The control device of claim 15 wherein said visual signal means includes light transmitting sections on said panel.

20. The control device of claim 14 wherein said straight lines intersect said neutral axis and extend radially outward thereof in opposite directions, said panel having a forward face and an opposite rearward face adjacent said plane, and wherein said control devices are mounted on a rear face of said panel.

21. The control device of claim 20 wherein said light pattern forming means includes a fixed light source on said neutral axis directed forwardly to illuminate and shadow portions of said rear faceward of said panel.

22. The control device of claim 21 wherein said light pattern forming means includes a shadow forming member mounted adjacent a rearwardly projecting end portion of said control shaft for blocking out light from said fixed light source to form a movable shadow pattern on said rearward panel face.

23. The control device of claim 22 wherein said shadow forming member comprises an opaque circular disk forming a circular pattern on said rearward panel face when said control shaft is aligned on said neutral axis and forming an elliptical shadow pattern whenever said shaft is out of said neutral position.

24. The control device of claim 20 including a support wall for said control device normal to said neutral axis and spaced rearwardly of said panel, said light pattern forming means forming a pattern on said wall.

25. The control device of claim 24 wherein said light pattern forming means includes a light source directed toward said wall and mounted on said control shaft for manipulation therewith to selectively illuminate one or more of said control devices.

26. A control comprising an elongated shaft supported for angular movement relative to a neutral axis about a pivot intermediate its ends, a fixed light source on said axis spaced from and directing light toward one end of said shaft, support wall means for said shaft normal to said axis spaced from said light source, a shadow disk mounted on said one end of said shaft for movement therewith to intercept light rays from said light source forming a shadow on said wall, and at least one pair of light sensitive electronic control devices mounted on said wall and spaced on opposite sides of said shaft within said shadow produced "with" when said shaft in a neutral position aligned with said axis.

27. The control of claim 26 including a pair of light receiving indicators mounted on said wall and spaced outwardly of said control devices in an illuminated area outside of a neutral shadow pattern formed on said wall when shaft is in said neutral position.

28. The control of claim 27 wherein said indicators comprise rods of light transmitting material extending axially parallel of said neutral axis and including a face angularly intersecting light rays from said light source for receiving the same.

29. The control of claim 28 wherein said face of each of said rods is aligned to intercept said light rays at an angle in accordance with an index of refraction of said light transmitting material for transmitting intercepted light in an axial direction along said rod.

30. The control of claim 29 wherein each of said rods has a viewing end opposite said face thereof for indicating the amount of light received by said rod.

* * * * *

UNITED STATES PATENT OFFICE

CERTIFICATE OF CORRECTION

Patent No. 3,811,047 Dated May 14, 1974

Inventor(s) Robert Shragal

It is certified that error appears in the above-identified patent and that said Letters Patent are hereby corrected as shown below:

Column 12, line 24, "with" (with in quotes) should be deleted; line 25, after "shaft" insert --is--.

Signed and Sealed this twenty-fourth Day of February 1976

[SEAL]

Attest:

RUTH C. MASON
*Attesting Officer*

C. MARSHALL DANN
*Commissioner of Patents and Trademarks*